US008408915B2

(12) United States Patent  
Hardy et al.

(10) Patent No.: US 8,408,915 B2
(45) Date of Patent: Apr. 2, 2013

(54) N-BACK EXERCISE FOR TRAINING COGNITION

(75) Inventors: Joseph L. Hardy, Richmond, CA (US); Henry W. Mahncke, San Francisco, CA (US); Travis W. Wade, San Francisco, CA (US)

(73) Assignee: Posit Science Corporation, San Francisco, CA (US)

( * ) Notice: Subject to any disclaimer, the term of this patent is extended or adjusted under 35 U.S.C. 154(b) by 1223 days.

(21) Appl. No.: 12/239,694

(22) Filed: Sep. 26, 2008

(65) Prior Publication Data

US 2009/0130640 A1 May 21, 2009

Related U.S. Application Data

(60) Provisional application No. 60/985,328, filed on Nov. 5, 2007.

(51) Int. Cl.
*G09B 1/00* (2006.01)

(52) U.S. Cl. .................... 434/167; 434/236; 434/238

(58) Field of Classification Search .................. 434/236, 434/238, 322, 323, 350, 353, 362, 167
See application file for complete search history.

(56) References Cited

U.S. PATENT DOCUMENTS

| | | | | |
|---|---|---|---|---|
| 4,464,121 A * | 8/1984 | Perelli | ............................. | 434/236 |
| 4,755,140 A * | 7/1988 | Rimland | ............................. | 434/236 |
| 4,770,636 A * | 9/1988 | Buschke | ............................. | 434/236 |
| 4,932,416 A * | 6/1990 | Rosenfeld | ..................... | 600/544 |
| 5,079,726 A * | 1/1992 | Keller | ............................. | 702/142 |
| 5,230,629 A * | 7/1993 | Buschke | ........................ | 434/236 |
| 5,595,488 A * | 1/1997 | Gozlan et al. | ................. | 434/236 |
| 6,053,739 A * | 4/2000 | Stewart et al. | ............... | 434/236 |
| 6,099,319 A * | 8/2000 | Zaltman et al. | .............. | 434/236 |
| 6,435,878 B1 * | 8/2002 | Reynolds et al. | ............. | 434/236 |
| 6,663,392 B2 * | 12/2003 | Leyva et al. | .................. | 434/236 |
| 6,875,181 B2 * | 4/2005 | Kajimoto et al. | ............ | 600/558 |
| 7,247,025 B1 * | 7/2007 | Leyva et al. | .................. | 434/236 |
| 7,294,107 B2 * | 11/2007 | Simon et al. | .................. | 600/300 |
| 7,837,472 B1 * | 11/2010 | Elsmore et al. | ............... | 434/236 |
| 8,078,253 B2 * | 12/2011 | Teicher et al. | ................ | 600/407 |
| 2008/0057483 A1 * | 3/2008 | Avidan | .......................... | 434/362 |
| 2008/0070207 A1 * | 3/2008 | Avidan | .......................... | 434/236 |
| 2009/0130640 A1 * | 5/2009 | Hardy et al. | .................. | 434/236 |
| 2010/0068684 A1 * | 3/2010 | Sabel | ............................. | 434/236 |
| 2011/0236864 A1 * | 9/2011 | Ashford | ........................ | 434/236 |
| 2011/0318723 A1 * | 12/2011 | Jeong | ............................ | 434/350 |
| 2012/0094265 A1 * | 4/2012 | Boler | ............................ | 434/362 |

* cited by examiner

*Primary Examiner* — Robert J Utama
(74) *Attorney, Agent, or Firm* — James W. Huffman

(57) ABSTRACT

Computer-implemented method for improving cognition. Multiple first and second stimulus elements are provided, where some of the second elements correspond to the first elements. A sequence of first stimulus elements is presented, each element presented for a duration separated by an interval. After a specified delay period, equal to the duration plus the interval, times a non-integer factor N, a sequence of groups of second elements is presented concurrently with the sequence of first elements, where each group includes a matching second element that matches a corresponding first element presented earlier by the specified delay period, i.e., presented N first elements back. For each presented group, the participant indicates the matching second element, or a second element in the group that doesn't match. The delay period is modified based on whether the participant responded correctly. The presenting, presenting, requiring, determining, and modifying are repeated in an iterative manner.

27 Claims, 8 Drawing Sheets

N-BACK EXERCISE FOR TRAINING COGNITION

CROSS REFERENCE TO RELATED APPLICATION(S)

This application claims the benefit of the following U.S. Provisional Patent Application, which is incorporated herein in its entirety for all purposes:

| Ser. No. | Filing Date: | Title: |
| --- | --- | --- |
| 60/985,328 | Nov. 5, 2007 | SPEEDED-N-BACK SPOKEN WORD MEMORY EXERCISE |

FIELD OF THE INVENTION

This invention relates in general to the use of brain health programs utilizing brain plasticity to enhance human performance and/or correct neurological disorders, and more specifically, to a method for training cognition using continuous delayed stimulus matching.

BACKGROUND OF THE INVENTION

Almost every individual has a measurable deterioration of cognitive abilities as he or she ages. The experience of this decline may begin with occasional lapses in memory in one's thirties, such as increasing difficulty in remembering names and faces, and often progresses to more frequent lapses as one ages in which there is passing difficulty recalling the names of objects, or remembering a sequence of instructions to follow directions from one place to another. Typically, such decline accelerates in one's fifties and over subsequent decades, such that these lapses become noticeably more frequent. This is commonly dismissed as simply "a senior moment" or "getting older." In reality, this decline is to be expected and is predictable. It is often clinically referred to as "age-related cognitive decline," or "age-associated memory impairment." While often viewed (especially against more serious illnesses) as benign, such predictable age-related cognitive decline can severely alter quality of life by making daily tasks (e.g., driving a car, remembering the names of old friends) difficult. More specifically, such age-related cognitive decline may include degradation of working memory (i.e., short-term memory) and attention.

In many older adults, age-related cognitive decline leads to a more severe condition now known as Mild Cognitive Impairment (MCI), in which sufferers show specific sharp declines in cognitive function relative to their historical lifetime abilities while not meeting the formal clinical criteria for dementia. MCI is now recognized to be a likely prodromal condition to Alzheimer's Disease (AD) which represents the final collapse of cognitive abilities in an older adult. The development of novel therapies to prevent the onset of this devastating neurological disorder is a key goal for modern medical science.

The majority of the experimental efforts directed toward developing new strategies for ameliorating the cognitive and memory impacts of aging have focused on blocking and possibly reversing the pathological processes associated with the physical deterioration of the brain. However, the positive benefits provided by available therapeutic approaches (most notably, the cholinesterase inhibitors) have been modest to date in AD, and are not approved for earlier stages of memory and cognitive loss such as age-related cognitive decline and MCI.

Cognitive training is another potentially potent therapeutic approach to the problems of age-related cognitive decline, MCI, and AD. This approach typically employs computer- or clinician-guided training to teach subjects cognitive strategies to mitigate their memory loss. Although moderate gains in memory and cognitive abilities have been recorded with cognitive training, the general applicability of this approach has been significantly limited by two factors: 1) Lack of Generalization; and 2) Lack of enduring effect.

Lack of Generalization:

Training benefits typically do not generalize beyond the trained skills to other types of cognitive tasks or to other "real-world" behavioral abilities. As a result, effecting significant changes in overall cognitive status would require exhaustive training of all relevant abilities, which is typically infeasible given time constraints on training.

Lack of Enduring Effect:

Training benefits generally do not endure for significant periods of time following the end of training. As a result, cognitive training has appeared infeasible given the time available for training sessions, particularly from people who suffer only early cognitive impairments and may still be quite busy with daily activities.

As a result of overall moderate efficacy, lack of generalization, and lack of enduring effect, no cognitive training strategies are broadly applied to the problems of age-related cognitive decline, and to date they have had negligible commercial impacts. The applicants believe that a significantly innovative type of training can be developed that will surmount these challenges and lead to fundamental improvements in the treatment of age-related cognitive decline. This innovation is based on a deep understanding of the science of "brain plasticity" that has emerged from basic research in neuroscience over the past twenty years, which only now through the application of computer technology can be brought out of the laboratory and into the everyday therapeutic treatment.

Thus, improved systems and methods for training cognition are desired.

SUMMARY

Various embodiments of a system and method are presented for performing a computer-based exercise to renormalize and improve working memory and attention of a participant.

Multiple first stimulus elements may be provided, where the multiple first stimulus elements are available for presentation to the participant. For example, a set of recorded (or synthesized) syllables (or words) may be stored in a memory medium of a computer system. In one exemplary embodiment, the set of first stimulus elements may include elements spoken by multiple (human) speakers, and may further include subsets or categories with differing degrees of confusability. In other words, various subsets of the set of first stimulus elements, e.g., syllables, may be characterized by the degree to which they are confusable, or conversely, by the degree to which they are distinguishable from each other. Multiple second stimulus elements, e.g., visual elements, e.g., textual and/or graphical elements, may also be provided, where the multiple second stimulus elements are available for presentation to the participant, and where at least a portion of the second stimulus elements correspond to the first stimulus elements. In other words, a set of second stimulus elements may be provided, where, for each first stimulus element the set of second stimulus elements includes a matching second stimulus element, e.g., for a spoken "dop" (an auditory first stimulus element), the set includes a matching second stimulus element, e.g., a textual, "dop" (a visual second stimulus element).

Embodiments of the cognitive training exercise described herein are preferably implemented using a graphical user interface (GUI), as well as through auditory means, e.g., speakers, such as headphones. In one embodiment, the GUI may include an initial or introductory screen that presents instructions to the participant regarding performance of the exercise. Note that in various embodiments, the instructions may be presented graphical (e.g., textually) and/or verbally, e.g., via a recorded or even synthesized message.

Note that in some embodiments, the instructions for a block may be different. For example, rather than instructing the participant to indicate the matching second stimulus elements, the instructions may specify that the participant is to indicate the second stimulus element that does not match. In some embodiments, the instructions may be held constant within a block, i.e., within a sequence of stimuli. Thus, in one embodiment, the method may include: for each block, presenting instructions for trials in the block, where the instructions instruct the participant to respond to each group by either indicating the matching second stimulus element, or indicating a second stimulus element in the group that does not match the corresponding first stimulus element. It should be noted, however, that in other embodiments, the instructions may be changed within a block, e.g., from trial to trial within a block, as desired.

A temporal sequence of a plurality of the first stimulus elements may be presented, including presenting each first stimulus element in the sequence for a specified duration separated by a specified interval. Said another way, the first stimulus elements, e.g., syllables, may be streamed to the participant, e.g., via speakers (e.g., headphones) in a metered manner, where each element is separated from the previous and next elements by a specified period of time. Thus, in contrast with prior art word memory exercises, rather than presenting words to the participant in discrete, discontinuous fashion, the present exercise streams first stimulus elements to the participant in a continuous (but metered or regulated) manner.

After a specified delay period, a temporal sequence of groups of a plurality of the second stimulus elements may be presented concurrently with the presenting the temporal sequence of the plurality of the first stimulus elements, where each group includes a matching second stimulus element that matches a corresponding first stimulus element presented earlier by the specified delay. In other words, the sequence of second stimulus elements (actually groups of second stimulus elements) is synchronized with the first stimulus sequence, but with a specified delay, where for each first stimulus element presenting in the temporal sequence of first stimulus elements, a matching second stimulus element is presented in a group, delayed by the specified delay period.

In preferred embodiments, the specified duration plus the specified interval composes a specified stimulus onset asynchrony (SOA), where each group of second stimulus elements is presented for the period of the SOA, and where the delay period comprises the SOA times a specified value N, i.e., N*SOA. Thus, the matching second stimulus element matches a corresponding first stimulus element presented N first stimulus elements back. Note that N may be an integer or a real number. For example, N could have a value of 1.2, where the matching first stimulus element is presented 1.2 elements back from the matching second stimulus element.

Thus, in one embodiment, following the initiation of the first stimulus element presentation by a (not necessarily integer) multiple of the SOA, e.g., where the multiplying factor may be specified or represented by a number N (which may not be an integer), a pair (or other sized group) of second stimulus elements, e.g., syllables (or words), may be presented on the screen and may remain for the period of the SOA.

The participant may be required to respond to the presented second stimulus elements. For example, the participant may be required to indicate the matching second stimulus element in each group, e.g., via a mouse, although any other means may be used as desired, e.g., keyboard keys, voice recognition, etc. In some embodiments, the participant may be required to respond to each group of second stimulus elements within a specified time, e.g., before the next second stimulus elements are displayed. Thus, for example, in a word/syllable embodiment, one of the words/syllables (e.g., randomly selected) in the group of second stimulus elements may correspond to the word/syllable heard N items back, and during the time the pair is displayed, the participant is required to make a response depending on the location of the target word/syllable and the instruction (which may be held constant within a block) to identify either the target or not-the-target.

The participant may be required to respond thusly for each group of second stimulus elements in the presented sequence. Note that concurrent with the participant's responses to the presented second stimulus elements, the participant is also expected to be monitoring, e.g., listening to, the continuing sequence of first stimulus elements so as to be able to identify subsequent matching second stimulus elements.

A determination may be made as to whether the participant responded correctly. For example, a determination may be made as to whether the participant correctly indicated each matching element in the presented sequence. In preferred embodiments, the method may include audibly and/or graphically indicating whether the participant responded correctly. For example, indicating whether the participant responded correctly may include indicating whether the participant's selection is correct for each group, e.g., for each selection or indication of a match, an indicative sound, such as a "ding" or "thunk" (and/or a graphical indication) may be played indicating whether that selection were correct or incorrect, respectively. Alternatively, or additionally, indicating whether the participant responded correctly may include: for each block, indicating whether the participant achieved a specified level of success for the block. In some embodiments, points may be awarded (in the case of a correct response and/or selection).

Thus, indicating whether the participant responded correctly may include: for each indication, indicating whether the indicated second stimulus element is correct, and/or for each block, indicating whether a specified level of success was achieved. Note that in various embodiments, not responding to a second stimulus element group (e.g., within the specified time period allowed for each stimulus) may be treated the same as, or differently from, an incorrect selection. For example, omitting a selection may count as some specified fraction of an incorrect selection.

The delay period may be modified based on the above determining. In other words, the time period by which a matching second stimulus element lags its matching first stimulus element may be adjusted based on whether the participant responded correctly. In one embodiment, adjusting the delay period may include decreasing the delay period if the participant responds correctly, and increasing the delay period if the participant responds incorrectly. Thus, for example, in one embodiment, the delay period may be set initially at 0 ms (i.e., no delay), and may be adapted based on performance.

In preferred embodiments, modifying the delay period may be performed using a maximum likelihood procedure, e.g., via one or more of: a QUEST (quick estimation by sequential testing) threshold procedure, or a ZEST (zippy estimation by sequential testing) threshold procedure, e.g., a single-stair maximum likelihood procedure.

The presenting the temporal sequence of the plurality of the first stimulus elements, presenting the temporal sequence of groups of the plurality of the second stimulus elements, requiring, determining, and modifying may be repeated one or more times in an iterative manner to improve the participant's cognition, e.g., executive function, attention, and/or working memory. For example, the repetitions may be performed over a plurality of sessions, e.g., over days, weeks, or even months, e.g., for a specified number of times per day, and for a specified number of days.

The above described presenting the temporal sequence of the plurality of the first stimulus elements, presenting the temporal sequence of groups of the plurality of the second stimulus elements, requiring, and determining, and possibly modifying, may compose performing a block in the exercise. Moreover, the presentation of a second stimulus element group and the participant's response to that group may comprise (or compose) a trial. In preferred embodiments, the repeating may include performing a block, e.g., a plurality of trials, under each of a plurality of configurations, where each configuration specifies one or more attributes of the first stimulus and/or second stimulus elements or their presentation, as will be described in more detail below.

In some embodiments, each response of the participant may be recorded. Similarly, in some embodiments, the method may include recording whether the participant responded correctly. For example, the responses and/or their correctness/incorrectness may be stored in a memory medium of the computing device, or coupled to the computing device.

It should be noted that while in some embodiments the first stimulus elements are auditory, e.g., spoken syllables, and the second stimulus elements are visual elements, e.g., textual elements that correspond to the syllables, in other embodiments, the first and/or second stimulus elements may be auditory or visual as desired. For example, in one embodiment, the first and second stimulus elements may be visual and auditory, respectively, or both the first and second stimulus elements may be visual, or both auditory, as desired.

In some embodiments, during the performance of the exercise, assessments may be made periodically, e.g., using a maximum likelihood procedure, e.g., a 2-stair maximum likelihood procedure, e.g., a 2-stair ZEST procedure, to determine or characterize the participant's progress in performing the exercise.

Other features and advantages of the present invention will become apparent upon study of the remaining portions of the specification and drawings.

DETAILED DESCRIPTION

Figure 1:
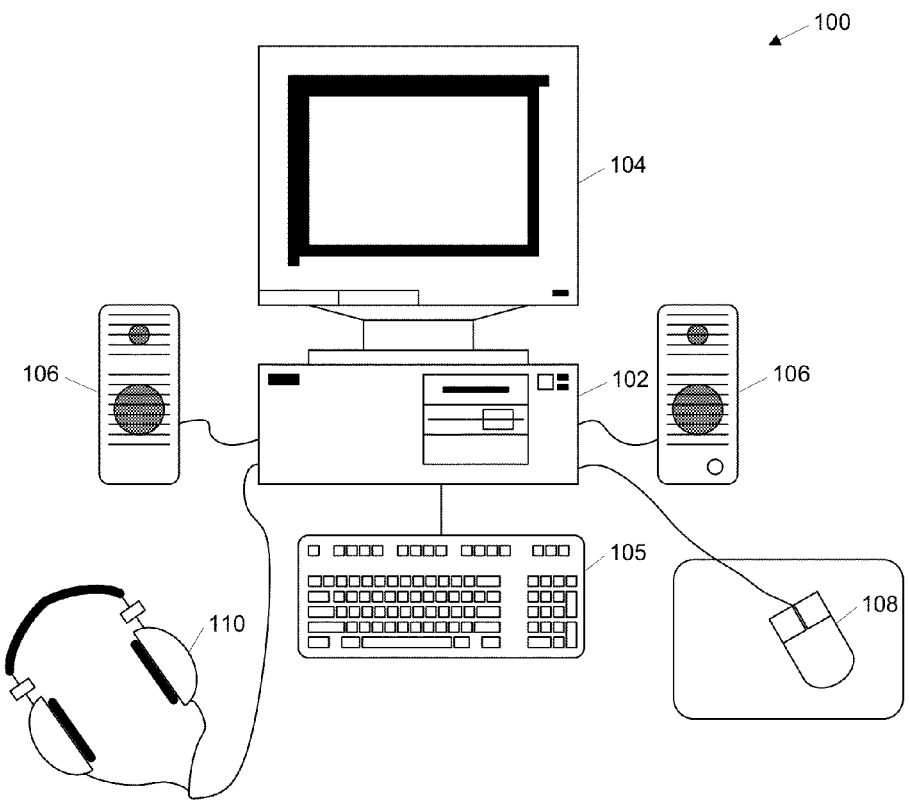
FIG. 1 is a block diagram of a computer system for executing a program according to some embodiments of the present invention.

Referring to FIG. 1, one embodiment of a computer system 100 is shown for executing a computer program to train, or retrain an individual according to the present invention to enhance cognition generally, where the term "cognition" refers to the speed, accuracy and reliability of processing of information, and attention and/or memory, and in some embodiments, to improve working memory and attention. The computer system 100 contains a computer 102, having a CPU, memory, hard disk and CD ROM drive (not shown), attached to a monitor 104. The monitor 104 provides visual prompting and feedback to the subject during execution of the computer program. As may be seen, in this embodiment, attached to the computer 102 are a keyboard 105, speakers 106, a mouse 108, and headphones 110 (which may be considered to be a type of speaker). In some embodiments, the speakers 106 and the headphones 110 may provide auditory prompting and feedback to the subject during execution of the computer program. The mouse 108 allows the subject to navigate through the computer program, and to select particular responses after visual or auditory prompting by the computer program. The keyboard 105 allows an instructor to enter alphanumeric information about the subject into the computer 102. Although a number of different computer platforms are applicable to the present invention, embodiments of the present invention execute on either IBM compatible computers or Macintosh computers, or similarly configured computing devices such as set top boxes, PDA's, gaming consoles, etc.

Figure 2:
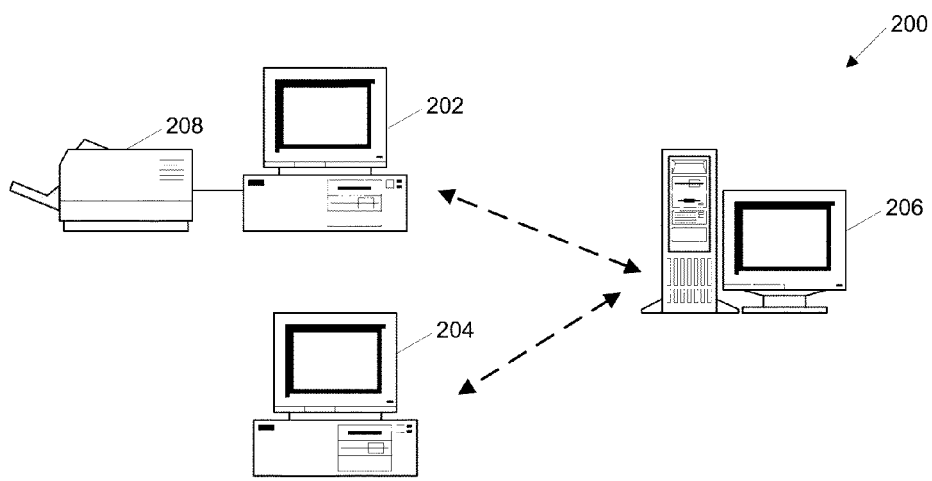
FIG. 2 is a block diagram of a computer network for executing a program according to some embodiments of the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can review the information and can then download configuration and control information pertaining to a particular subject, back to the subject's computer 202, 204.

Overview of the Cognitive Training Exercise

Embodiments of the computer-based exercise described herein may operate to renormalize and improve working memory and attention (and cognition in general) of a participant, e.g., to improve storage, retention, and retrieval of short-term and visual memory.

In some embodiments, the cognitive training exercise comprises an N-back task whose purpose is to target speed and precision of processing and encoding of stimulus elements, e.g., syllable-level speech sounds and text, in a memory-intensive context that may complement other related cognitive training exercises, such as the Match It and Sound Replay exercises provided by Posit Science Corporation, in applying more directly to certain aspects of cognition, such as, for example, the executive and short-term memory demands of the natural language environment, by (1) presenting targets, e.g., syllables, words, shapes, objects, patterns, etc.,—and the memory task—in a continuous manner rather than across discrete trials, and (2) incorporating temporal and locational elements of attention and suppression, and task-switching. In preferred embodiments, this may take the form of a continuous delayed recognition memory task in which participants press buttons depending on the sequence of first stimulus elements, e.g., words recently heard, over a variably sized moving window of stimuli, e.g., sounds. A maximum likelihood procedure, e.g., a ZEST algorithm, may be used within blocks (e.g., within sequences) to modulate the presentation rate of first stimulus element, e.g., syllables/words, and/or across blocks to choose the window size (N), or, alternatively, within blocks to modulate the window size (N), and/or, across blocks to modulate the presentation rate of the first stimulus elements, e.g., syllables/words. Thus, over the course of the exercise, one or more aspects of the stimuli and/or their presentation may be adjusted in an adaptive manner, based on the participant's performance.

It should be noted that various embodiments of the cognitive training exercise described herein, and/or other eye movement tasks, may be used singly or in combination in the exercise. Moreover, as described below, in some embodiments, stimulus threshold assessments may also be performed in conjunction with, or as part of, the exercise, thus facilitating more effective training of the participant's cognitive systems, e.g., executive function, working memory, and attention systems.

More details regarding embodiments of the invention are discussed below.

Figure 3:
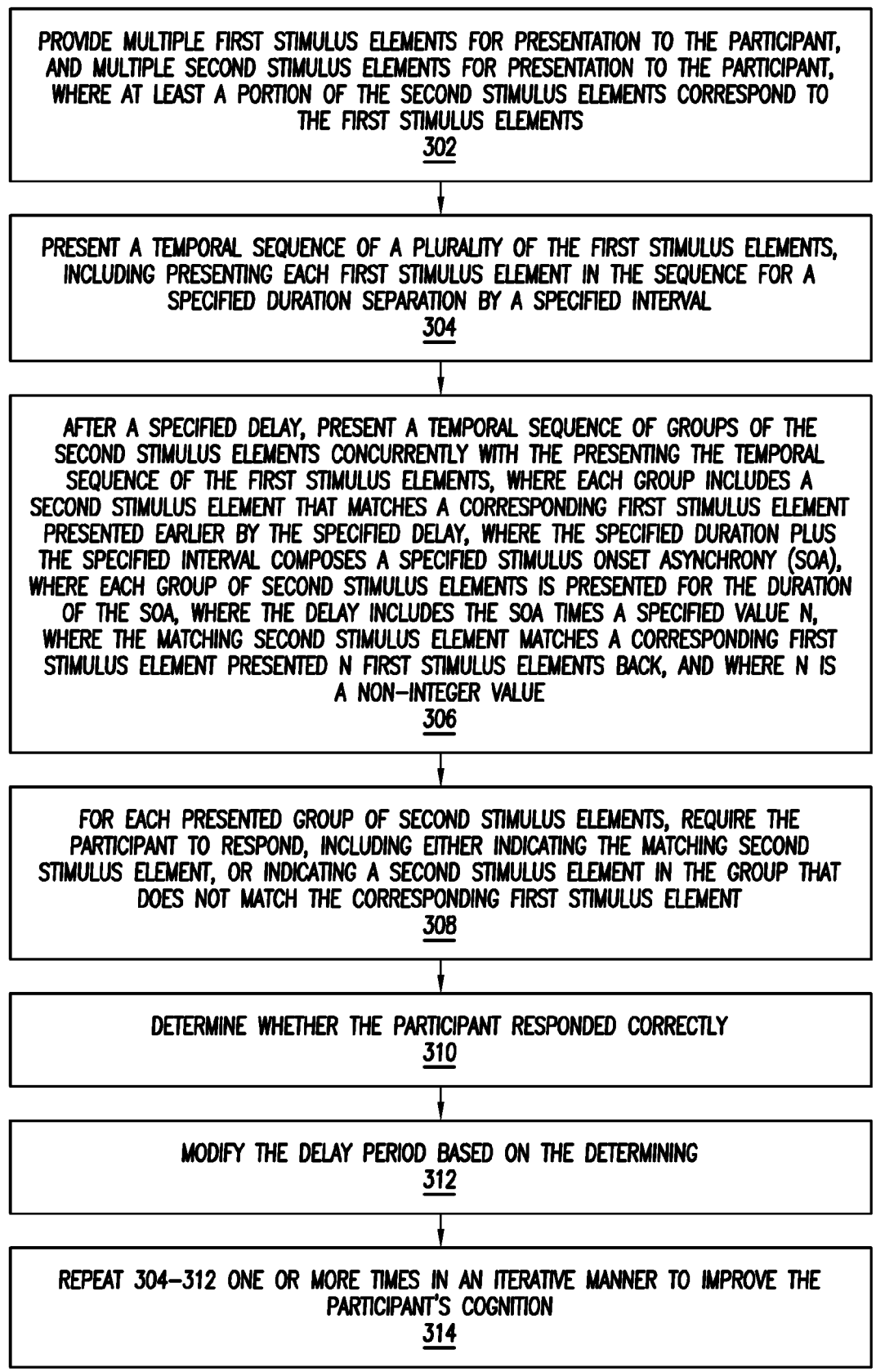
FIG. 3 is a high-level flowchart of one embodiment of a method for improving cognition, according to one embodiment.

FIG. 3—Flowchart of a Computer-Implemented Method for Improving Executive Function, Attention, and Working Memory, FIG. 3 is a high-level flowchart of one embodiment of a method for improving executive function, attention, and working memory. More specifically, the method utilizes a computing device to present first stimuli (e.g., auditory) and delayed matching second stimuli (e.g., visual) for training, and to record responses from the participant. It should be noted that in various embodiments, some of the method elements may be performed concurrently, in a different order than shown, or may be omitted. Additional method elements may also be performed as desired. As shown, the method may be performed as follows:

In 302, multiple first stimulus elements may be provided, where the multiple first stimulus elements are available for presentation to the participant. For example, in one embodiment, a set of recorded (or synthesized) syllables (or words) may be stored in a memory medium of a computer system. In one exemplary embodiment, the set of first stimulus elements may include auditory elements, e.g., elements spoken by multiple (human) speakers. In some embodiments, the first stimulus elements may include subsets or categories with differing degrees of confusability. In other words, various subsets of the first stimulus elements may be characterized by the degree to which they are confusable, or conversely, by the degree to which the elements are distinguishable from each other. Multiple second stimulus elements, e.g., textual and/or graphical elements, may also be provided, where the multiple second stimulus elements are available for presentation to the participant, and where at least a portion of the second stimulus elements correspond to the first stimulus elements. In other words, a set of second stimulus elements may be provided, where, for each first stimulus element the set of second stimulus elements includes a matching second stimulus element, e.g., for a spoken "dop" (an auditory first stimulus element), the set includes a matching second stimulus element, e.g., a textual, "dop" (a visual second stimulus element).

It should be noted that in various embodiments, the first stimulus elements and the second stimulus elements may include auditory and/or visual stimulus elements as desired, where auditory elements may include spoken or synthesized words or syllables and sounds, among others, and where the visual elements may include textual words or syllables, shapes, (images of) objects, and patterns, among others.

Embodiments of the cognitive training exercise described herein are preferably implemented using a graphical user interface (GUI), and possibly also through auditory means, e.g., speakers, such as headphones. In one embodiment, the GUI may include an initial or introductory screen that presents instructions to the participant regarding performance of the exercise. Note that in various embodiments, the instructions may be presented graphical (e.g., textually) and/or verbally, e.g., via a recorded or even synthesized message.

Figure 4:
FIG. 4 illustrates a screenshot of an exemplary graphical interface with instructions for a cognitive training exercise, according to one embodiment.

FIG. 4 illustrates an exemplary screenshot of a GUI, e.g., before a sequence or block of stimuli is presented, according to one embodiment. As may be seen, in this example, general instructions are provided at the top of the screen: "click WHAT YOU HEAR, in the order you hear it", and more specific instructions are provided below: "press any key to begin". Note that this second instruction is displayed twice—once in each of two response locations where response buttons may subsequently be displayed during the exercise. Thus, the participant may be prompted to start a block by pressing a key. Of course, other GUI arrangements or designs may be used as desired. Once a key or button has been pressed, the block may begin and a sequence presentation may be initiated, as will be described in detail below.

Note that in some embodiments, the instructions for a block may be different. For example, rather than instructing the participant to indicate the matching second stimulus elements, the instructions may specify that the participant is to indicate the second stimulus element that does not match. In preferred embodiments, the instructions may be held constant within a block, i.e., within a sequence of stimuli. Thus, in one embodiment, the method may include: for each block, presenting instructions for trials in the block, where the instructions instruct the participant to respond to each group by either indicating the matching second stimulus element, or indicating a second stimulus element in the group that does not match the corresponding first stimulus element.

In 304, a temporal sequence of a plurality of the first stimulus elements may be presented, including presenting each first stimulus element in the sequence for a specified duration separated by a specified interval. For example, in one embodiment, the first stimulus elements, e.g., syllables, may be streamed to the participant via speakers (e.g., headphones) in a metered manner, where each element is separated from the previous and next elements by a specified period of time. Thus, in contrast with prior art word memory exercises, rather than presenting words to the participant in discrete, discontinuous fashion, the present exercise streams first stimulus elements to the participant in a continuous (but metered or regulated) manner.

In 306, after a specified delay period, a temporal sequence of groups of a plurality of the second stimulus elements may be presented concurrently with the presenting the temporal sequence of the plurality of the first stimulus elements (of 304), where each group includes a matching second stimulus element that matches a corresponding first stimulus element presented earlier by the specified delay. In other words, the sequence of second stimulus elements (actually groups of second stimulus elements) is synchronized with the first stimulus sequence, but with a specified delay, where for each first stimulus element presenting in the temporal sequence of first stimulus elements, a matching second stimulus element is presented in a group, delayed by the specified delay period.

In preferred embodiments, the specified duration plus the specified interval composes a specified stimulus onset asynchrony (SOA), where each group of second stimulus elements is presented for the period of the SOA, and where the delay period comprises the SOA times a specified value N, i.e., N*SOA. Thus, the matching second stimulus element matches a corresponding first stimulus element presented N first stimulus elements back. Note that N may be an integer or a real number. For example, N could have a value of 1.2, where the matching first stimulus element is presented 1.2 elements back from the matching second stimulus element.

Figure 5:
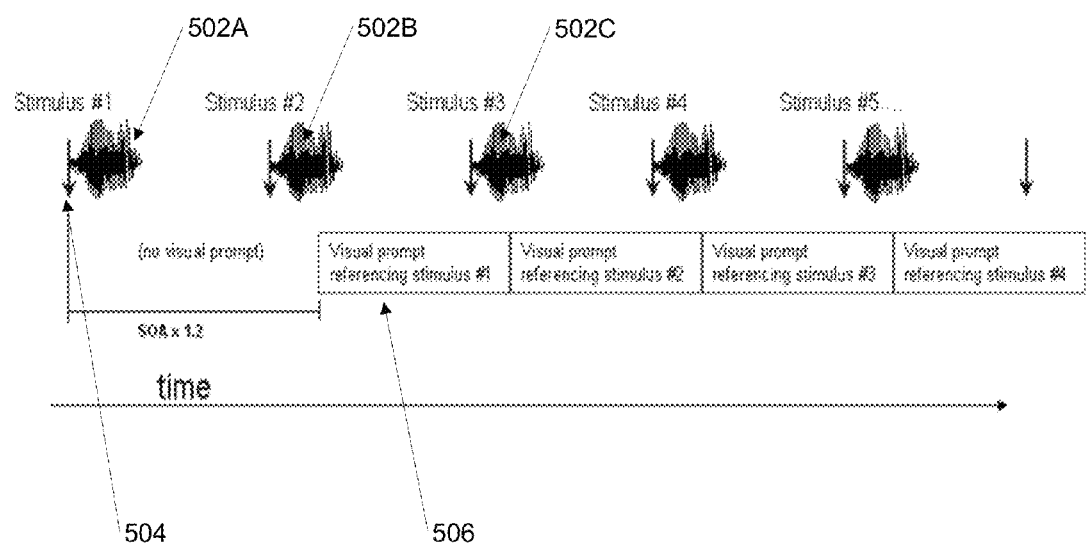
FIG. 5 illustrates relative timing of an auditory sequence and a corresponding visual sequence, according to one embodiment.

FIG. 5 illustrates just such a presentation, where the first and second stimuli are respective auditory and visual streams, presented with a specified delay of 1.2N, according to one embodiment. As FIG. 5 indicates, a stream of auditory elements (first stimulus elements) 502 is presented, specifically, stimulus #1 502A, stimulus #2 502B, stimulus #3 502C, etc., are presented in a temporal sequence, with stimulus #1 502A preceding stimulus #2 502B, stimulus #2 502B preceding stimulus #3 502C, and so forth, consonant with time increasing from left to right, as indicated by the timeline at the bottom of the figure. Note that stimulus #1 502A is presented beginning at time 504. Below these auditory (first stimulus) elements is illustrated a sequence of visual elements (second stimulus elements), here referred to as visual prompts, referencing respective ones of the auditory elements (first stimulus elements). Note that the visual prompt referencing stimulus #1 502A (i.e., the visual element matching the first auditory element in the sequence) is presented with a delay period of 1.2*SOA with respect to the onset of stimulus #1, i.e., with respect to time 504. Note also that each visual prompt is presented in a group of visual elements, e.g., as part of a pair or larger group. Similarly, each successive visual prompt in the sequence of groups of visual elements is presented with this same delay period relative to their respective corresponding auditory elements or stimuli. Thus, as FIG. 5 shows, the visual prompt referencing stimulus #2 is presented 1.2*SOA after the onset of stimulus #2 502B, and so on regarding the other visual prompts (second stimulus elements) and auditory stimuli (first stimulus elements).

Figure 6:
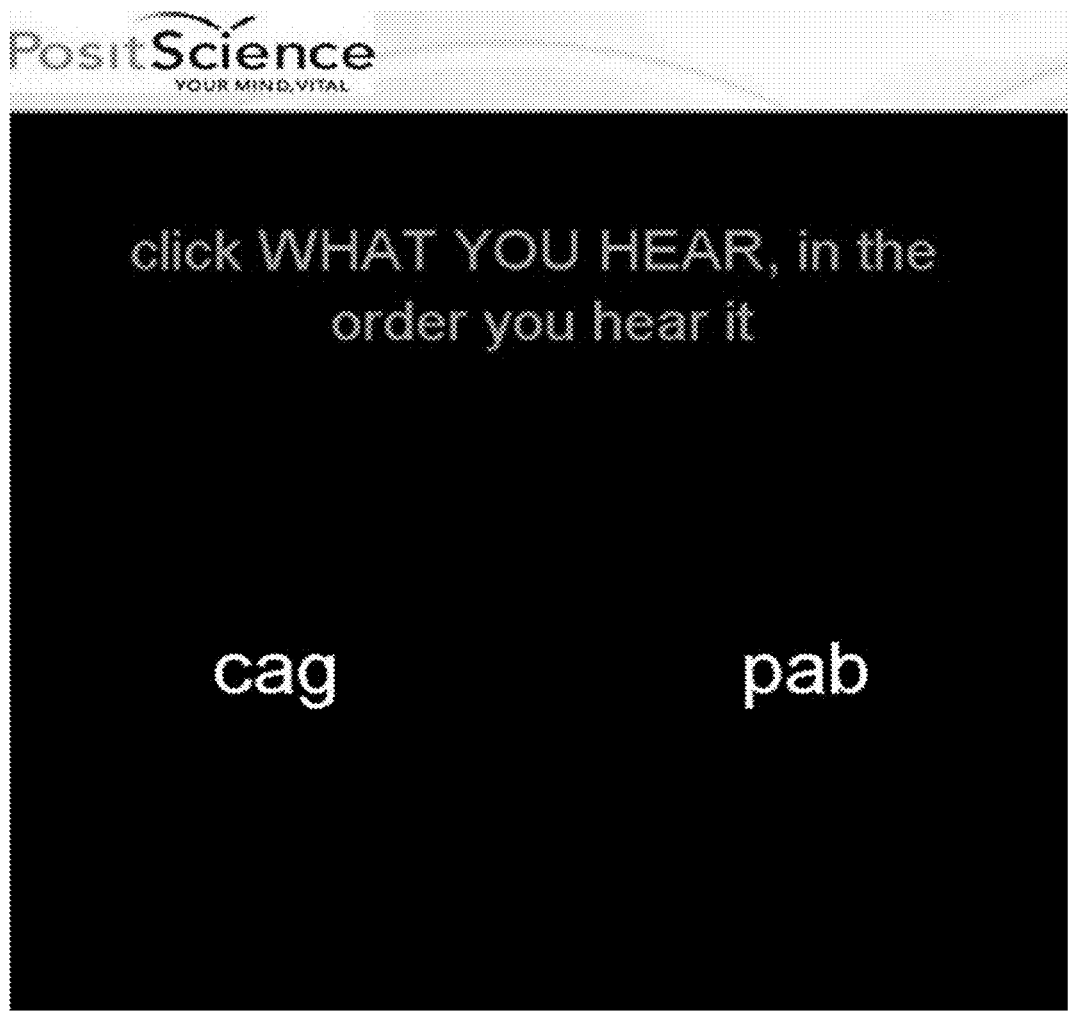
FIG. 6 illustrates a screenshot of another exemplary graphical interface with instructions and visual stimuli for a cognitive training exercise, according to one embodiment.

Thus, in this exemplary embodiment, following the auditory presentation by a (not necessarily integer) number (N) multiple of the SOA, e.g., where the multiplying factor may be specified or represented by a number N (which may not be an integer), a pair (or other sized group) of syllables may be presented on the screen and may remain for the period of the SOA. FIG. 6 illustrates an exemplary screenshot of the GUI after presentation of a visual sequence has been initiated, specifically, where a group (in this case, a pair) of visual elements is displayed, i.e., visually presented. As may be seen, in this embodiment, the instructions for this sequence are displayed at the top of the screen, and a pair of visual elements is shown below, in this case, "cag" and "pab". Following the example of FIG. 5, presumably, at a time 1.2*SOA earlier, one of these syllables was presented as part of the auditory sequence, say, for example, "pab", and so "pab", i.e., the right element of the pair, is the correct target stimulus. In other words, FIG. 6 shows the presentation of auditory and visual stimuli in a 1.2-back block. Note that while in general N may be a positive number, in some embodiments, N may be negative, in which case the second stimuli may precede a current first stimulus.

It should be noted that while in the exemplary embodiments described above the first stimulus elements are auditory, e.g., spoken syllables, and the second stimulus elements are visual elements, e.g., textual elements that correspond to the syllables, in other embodiments, the first and/or second stimulus elements may be auditory or visual as desired. For example, in one embodiment, the first and second stimulus elements may be visual and auditory, respectively, or both the first and second stimulus elements may be visual, or both auditory, as desired.

In 308, the participant may be required to respond to the presented second stimulus elements. For example, the participant may be required indicate the matching second stimulus element in each group, e.g., via a mouse, although any other means may be used as desired, e.g., keyboard keys, voice recognition, etc. In some embodiments, the participant may be required to respond to each group of second stimulus elements within a specified time, e.g., before the next second stimulus elements are displayed.

Referring again to FIG. 6, in this particular case, the participant should indicate the second stimulus element "pab", e.g., by clicking on "pab" with a mouse, indicating the position of "pab" with an arrow key (e.g., the "right" arrow key), speaking "pab" into a microphone, etc. Thus, for example, one of the words (e.g., randomly selected) in the visual stimulus may correspond to the syllable heard N items back, and during the time the pair is displayed, the participant is required to make a response depending on the location of the target word and the instruction (which may be held constant within a block) to identify either the target or not-the-target.

The participant may be required to respond thusly for each group of second stimulus elements in the presented sequence. Note that concurrent with the participant's responses to the presented second stimulus elements, the participant is also expected to be monitoring, e.g., listening to, the continuing sequence of first stimulus elements so as to be able to identify subsequent matching second stimulus elements.

In 310, a determination may be made as to whether the participant responded correctly. For example, a determination may be made as to whether the participant correctly indicated each matching element in the presented sequence. In preferred embodiments, the method may include audibly and/or graphically indicating whether the participant responded correctly. For example, indicating whether the participant responded correctly may include indicating whether the participant's selection is correct for each group, e.g., for each selection or indication of a match, an indicative sound, such as a "ding" or "thunk" (and/or a graphical indication)

may be played indicating whether that selection were correct or incorrect, respectively. Alternatively, or additionally, indicating whether the participant responded correctly may include: for each block, indicating whether the participant achieved a specified level of success for the block. In some embodiments, points may be awarded (in the case of a correct response and/or selection).

Of course, any other type of indication may be used as desired. For example, in one embodiment, a first sound, e.g., a wind sound, may be played when the participant makes a correct selection, and a second sound, e.g., a chime sound, may be played when the participant has made all location indications correctly. Thus, indicating whether the participant responded correctly may include: for each indication, indicating whether the indicated second stimulus element is correct, and/or for each block, indicating whether a specified level of success was achieved. Note that in various embodiments, not responding to a second stimulus element group (e.g., within the specified time period allowed for each stimulus) may be treated the same as, or differently from, an incorrect selection. For example, omitting a selection may count as some specified fraction of an incorrect selection.

In 312, the delay period may be modified based on the above determining. In other words, the time period by which a matching second stimulus element lags its matching first stimulus element may be adjusted based on whether the participant responded correctly. In one embodiment, adjusting the delay period may include decreasing the delay period if the participant responds correctly, and increasing the delay period if the participant responds incorrectly. Thus, for example, in one embodiment, the delay period may be set initially at 0 ms (i.e., no delay), and may be adapted based on performance.

In 314, the presenting the temporal sequence of the plurality of the first stimulus elements, presenting the temporal sequence of groups of the plurality of the second stimulus elements, requiring, determining, and modifying may be repeated one or more times in an iterative manner to improve the participant's executive function, attention, and working memory. For example, the repetitions may be performed over a plurality of sessions, e.g., over days, weeks, or even months, e.g., for a specified number of times per day, and for a specified number of days.

The above described presenting the temporal sequence of the plurality of the first stimulus elements, presenting the temporal sequence of groups of the plurality of the second stimulus elements, requiring, and determining, and possibly modifying, may compose performing a block in the exercise. Moreover, the presentation of a group of second stimulus elements and the participant's response to that group may comprise (or compose) a trial. In preferred embodiments, the repeating may include performing a block, e.g., a plurality of trials, under each of a plurality of configurations, where each configuration specifies one or more attributes of the first stimulus elements and/or second stimulus elements or their presentation, as will be described in more detail below.

In some embodiments, each response of the participant may be recorded. Similarly, in some embodiments, the method may include recording whether the participant responded correctly. For example, the responses and/or their correctness/incorrectness may be stored in a memory medium of the computing device, or coupled to the computing device.

There are several ways in which the delay period may be adjusted. For example, as noted above, the delay period may be specified as N*SOA, and so the delay may be modified or adaptively adjusted by changing the value of N, of SOA, or both. In one exemplary embodiment, SOA may be set initially at 2.25 s, and N may be set initially at 0 or some other small value, and these attributes may be adjusted over the course of the exercise, although these values are meant to be exemplary only, and are not intended to limit the values or modifications to any particular values or schema. As noted above, in some embodiments, N or SOA may be adjusted within a block, and the other may be adjusted between blocks. Typically, N will be increased to increase the difficulty of the task, and SOA will be decreased (which operates to increase the presentation rate) to increase the difficulty of the task.

Thus, for example, in one embodiment, each block may include a plurality of trials, each trial including the presentation of a group and the participant's response. Determining if the participant responded correctly may include: for each trial, determining if the participant responded correctly for the trial, and modifying the delay period may include modifying N. Additionally, determining if the participant responded correctly may further include: for each block, determining whether the participant achieved a specified level of success, and modifying the delay period may include modifying the SOA based on determining whether the participant achieved the specified level of success. For example, determining whether the participant achieved a specified level of success for a block may include determining if N exceeds a specified threshold value at the end of the block. In other words, N may be adjusted during the block based on the participant's response to each group, and at the end of the block, the SOA may be adjusted based on whether N has exceeded some specified threshold.

Alternatively, in some embodiments, determining if the participant responded correctly may include: for each trial, determining if the participant responded correctly for the trial, and modifying the delay period may include modifying the SOA. Additionally, determining if the participant responded correctly may further include: for each block, determining whether the participant achieved a specified level of success, and modifying the delay period may include modifying N based on determining whether the participant achieved the specified level of success for the block. For example, determining whether the participant achieved a specified level of success may include determining if the SOA is below a specified threshold value at the end of the block. In other words, the SOA may be adjusted during the block based on the participant's response to each group, and at the end of the block, N may be adjusted based on whether the SOA has a value below some specified threshold.

As mentioned above, in preferred embodiments, modifying the SOA and/or modifying N may be performed using a maximum likelihood procedure, e.g., via one or more of: a QUEST (quick estimation by sequential testing) threshold procedure, or a ZEST (zippy estimation by sequential testing) threshold procedure, e.g., a single-stair maximum likelihood procedure, as described below in more detail.

Thus, for example, in an embodiment where SOA is adjusted within a block and N is adjusted between blocks, the ZEST procedure may be is used to choose SOA within blocks and N across blocks. Within a block, the SOA may be initially set at a level somewhat easier than the estimated threshold for hearing and remembering, and may be decreased with correct responses (in testing, 2-2.5 s has been a reasonable starting value, and 1 s a reasonable minimum value). A block may be considered "correct" if the final SOA after a block, e.g., after 50 trials, is below a critical threshold value (e.g., 1.5 s may be appropriate, depending on the starting value), and this may be used to adjust N (e.g., initially set to 0) for the following block.

It should be noted that while in preferred embodiments the delay period is adjusted, in other embodiments, in addition to, or instead of, the delay period, other attributes of the stimuli and/or the presentation may be adjusted or modified as desired. Such adaptively adjustable attributes may be referred to generically as stimulus intensity. In other words, the stimulus intensity may be any adjustable attribute of the stimulus elements and/or their presentation, e.g., the eccentricity (e.g., distance apart) of the respective positions of visual stimulus elements in the visual field, the number of elements in the temporal sequences, the clarity of the stimulus elements, etc., among others. In other words, the stimulus intensity may refer to any adjustable attribute of the stimulus and/or its presentation that may be modified to increase or decrease the difficulty of trials or blocks in the exercise. Thus, more generally, in some embodiments, the sequence(s) of stimulus (e.g., auditory and/or visual) elements may be presented with a specified stimulus intensity, and the stimulus intensity may be modified based on the participant's response, where modifying the stimulus intensity may include (adaptively) modifying any of these adjustable attributes as desired.

In some embodiments, over the course of performing the plurality of trials, the delay period may be adjusted (i.e., the modifying of 312) to approach and substantially maintain a specified success rate for the participant. For example, the delay period may be adjusted to approach and substantially maintain a specified success rate for the participant uses a single stair maximum likelihood procedure, e.g., a single stair ZEST procedure. Moreover, in further embodiments, the adjusting the delay period to approach and substantially maintain a specified success rate for the participant may be performed for each of the plurality of configurations, as will be discussed in more detail below.

FURTHER EXEMPLARY EMBODIMENTS

The below describes exemplary embodiments of further versions of the cognitive training exercise presented, although it should be noted that any various aspects of the embodiments described herein may be utilized with respect to any other embodiments of the exercise as desired.

As discussed above, in preferred embodiments, the exercise may include performing a block, e.g., a plurality of trials, under each of a plurality of configurations, where each configuration specifies one or more attributes of the first stimulus elements and/or second stimulus elements or their presentation. More specifically, performing a plurality of trials under each of a plurality of configurations may include performing a plurality of trials under each of a plurality of configurations of varying difficulty, e.g., increasingly difficult configurations, where the attributes specified by these configurations may be referred to as "progressive" attributes, since they are modified (as part of the configuration specification) as the user progresses through the exercise, as opposed to the adaptive attributes contributing to the delay period.

For example, in one embodiment, each group of second stimulus elements is a pair of second stimulus elements comprising the matching second stimulus element and a non-matching second stimulus element, where the matching second stimulus element is presented on the left side of the non-matching second stimulus element, or on the right side of the non-matching second stimulus element, as exemplified by FIG. 6. In some embodiments, the presentation of the first stimulus elements may be made based on this "handedness" of the presentation of the second stimulus elements. For example, presenting each first stimulus element may include presenting the first stimulus element, e.g., an auditory element, to the participant's left side, right side, or both sides equally, e.g., using stereophonic capabilities of the computer system. Thus, configurations may specify any of various "progressive" attributes of the stimuli and their presentation.

In one embodiment, each of the plurality of configurations may specify one or more of:

stimulus set, including a set of first stimulus elements from which the plurality of first stimulus elements of the sequence are selected, and a set of second stimulus elements comprising second stimulus elements that match at least a subset of the first stimulus elements, where each set of first stimulus elements has a specified confusability, e.g., discriminibility with respect to other elements in the set; or direction of first stimulus presentation, including one of:
  a. consistent, wherein each first stimulus element and the corresponding second stimulus element are presented on a same side;
  b. binaural, wherein each first stimulus element is presented to the participant's left and right sides equally;
  c. random, wherein each first stimulus element is presented to the participant's left or right side randomly; or
  d. distracting, wherein each first stimulus element and the corresponding second stimulus element are presented on different sides, respectively.

Note that when the direction of the first stimulus presentation is specified as distracting, e.g., where the sound is presented to the same ear as the target approximately 80% of the time, the tendency of the participant may be to treat the side of the (first stimulus) presentation as a cue, as with the consistent case, but should remember that the cue is unreliable and thus should be ignored. Note further that testing suggests that the above presentation schemes (direction attribute) vary from easiest to hardest as listed above.

Combinations of these two attributes, then, may provide for a well-defined set of discrete difficulty levels, which can be either selected by the participant or implemented on a schedule. Similarly, the choice of instruction (target or not-target) can be either constant, random, or alternating across blocks, providing for more flexibility in difficulty. In one embodiment, this selection (target/non-target instructions) may be constant (target only) during initiation, and random thereafter.

Thus, in addition to the adaptive modification of the delay period, various other attributes may be modified as well, although these other attributes may be adjusted in a progressive manner, rather than adaptive. In other words, as the participant progresses through the exercise, successive configurations may be used that progressively specify or modify these attributes to increase the difficulty of the matching task. Note that the above (progressive) attributes are meant to be exemplary only, and that other attributes may be used as desired, e.g., length of sequences, clarity of auditory elements, e.g., different (human) speakers, levels of audio processing, clarity of visual elements, colors, distinguishability of stimuli, etc., among others. For example, regarding the above attribute "stimulus set", in one embodiment, there may be five categories of stimuli, differing in confusability, and recorded by three different speakers, e.g., men and women with different pitch ranges, speaking styles, etc., although other attributes and/or values of attributes, may be used as desired. Of course, any of these attributes (e.g., singletons, pairs, or groups) may be varied according to any relationships desired. Note that each configuration may include some specified number of trials. For example, in one exemplary embodiment, each configuration may include 50 trials, although other numbers of trials may be used as desired. As described above, the participant may click buttons (or otherwise indicate matches) in accordance with the instructions and the positions of the target words. Depending on the accuracy of responses, the SOA and/or N may be adjusted within 50-element blocks such that the presentation rate increases with success. Of course, the particular numbers and values presented herein are exemplary only, and any other numbers and values may be used as desired. While the above describes various exemplary adaptive and progressive attributes that may be varied or modified over the course of the exercise, it should be noted that in various other embodiments, any of these (and/or other) attributes may be modified adaptively or progressively as desired.

Note that in various embodiments, other interfaces, e.g., other GUIs with various presentation/selection mechanisms, may be used. For example, motion and interactivity may be added to the task without undermining the key goals described above. A more engaging task may be more likely to improve the participant's ability to modulate key neurotransmitter systems.

Figure 7:
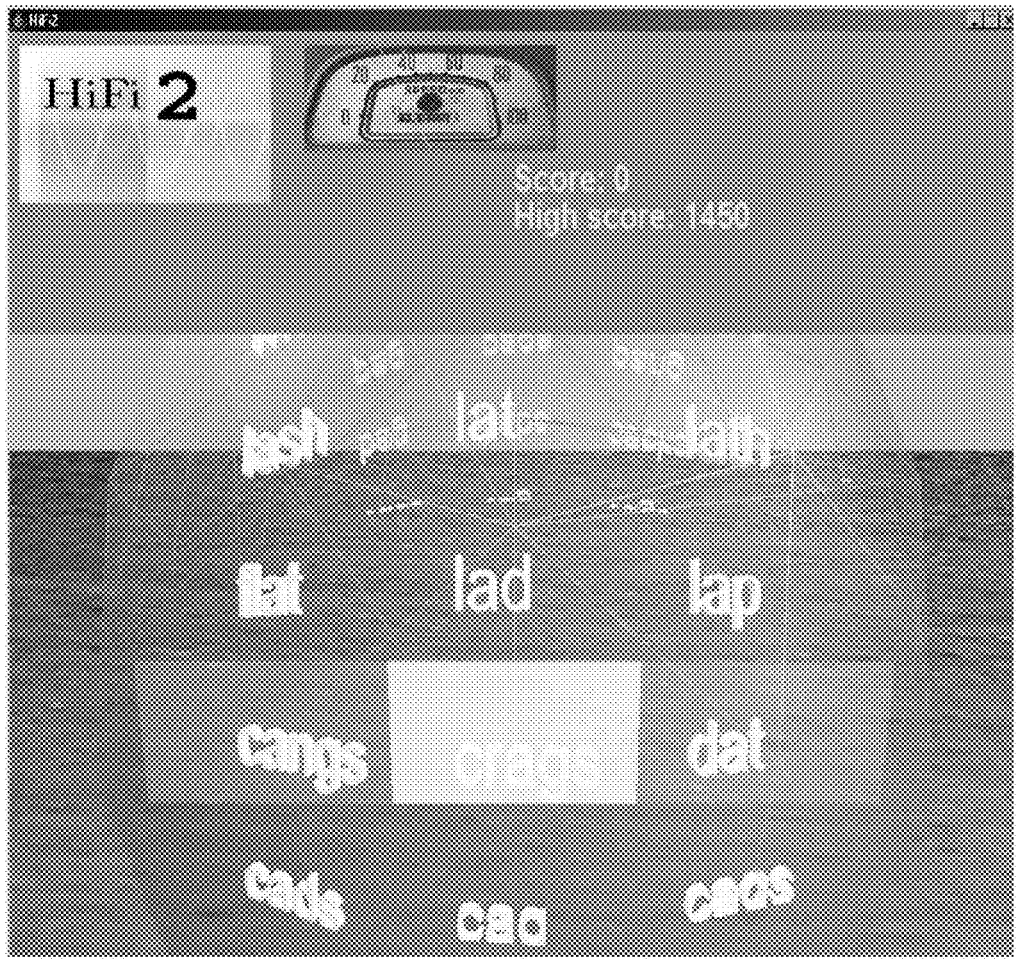
FIG. 7 illustrates a screenshot of yet another exemplary graphical interface with visual stimuli for a cognitive training exercise, according to one embodiment.

FIG. 7 illustrates one exemplary GUI where triplets of second stimulus elements are presented via a rotating spherical grid. As may be seen, in this embodiment, the grid rotates to present successive triplets of second stimulus elements, from which the participant must select a matching element (that matches an first stimulus element presented N elements back). Variations of this approach may include, among others, rotating the grid in a continuous manner, such that each triplet is displayed for the specified period of time, rotating the grid discretely, so that each triplet is display statically for the specified period of time, implementing the "direction" attribute such that the "binaural" mode indicates a cue for the middle position of the triplet (with "consistent" retaining its previous meaning, as explained above), and so forth. As another variant, a 3×3 grid of second stimulus elements, e.g., textual syllables, may be presented, where the participant may indicate the position of the matching second stimulus element with a mouse, or, e.g., via a 3×3 numeric keypad.

Thus, more generally, in some embodiments, each group of second stimulus elements may include three or more second stimulus elements, where the presenting the temporal sequence of groups of the plurality of the second stimulus elements may include visually presenting a two-dimensional grid of the second stimulus elements comprising the matching second stimulus element and two or more non-matching second stimulus elements, wherein the matching second stimulus element is visually presented at a specified position in the grid, and where requiring the participant to respond includes indicating the position in the grid of matching second stimulus element.

Figure 8:
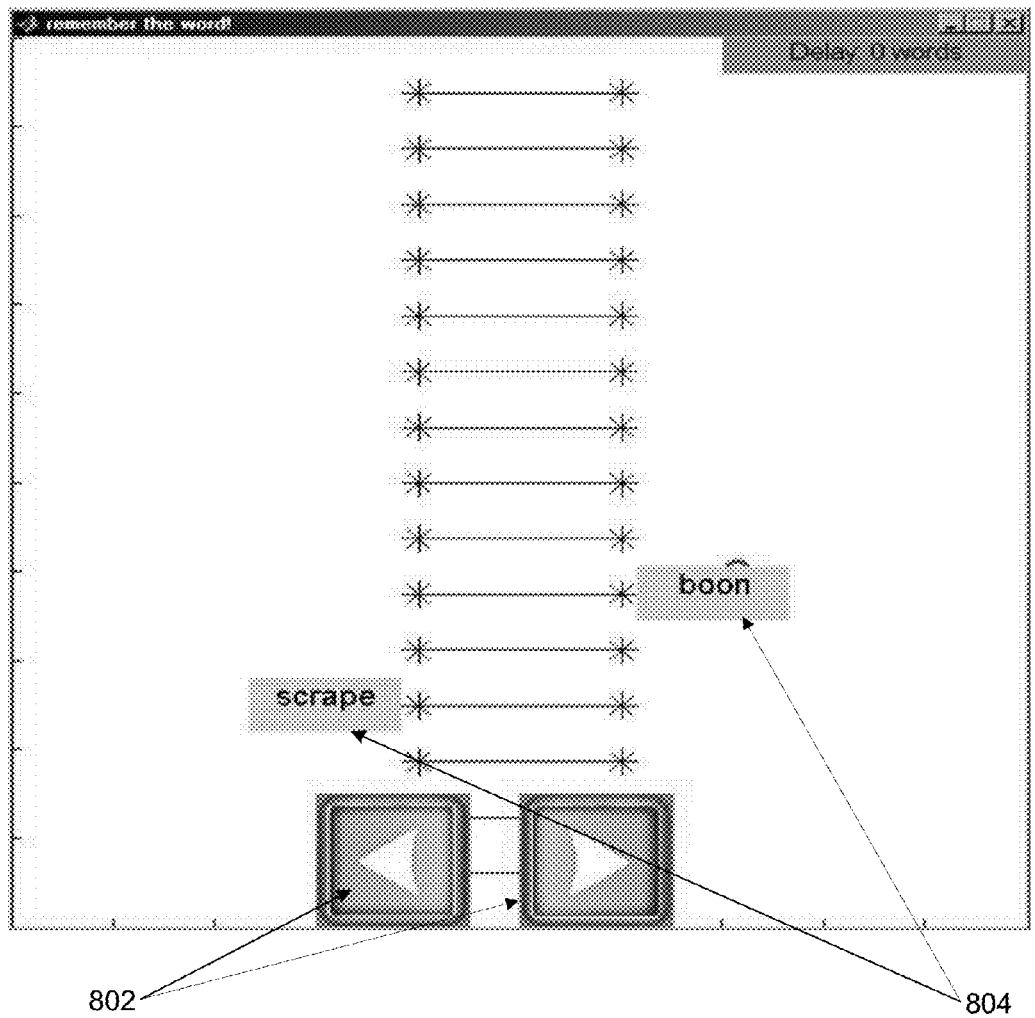
FIG. 8 illustrates a screenshot of a further exemplary graphical interface with visual stimuli for a cognitive training exercise, according to one embodiment.

FIG. 8 illustrates yet another exemplary GUI, where the GUI presents pairs of second stimulus elements 804 in a vertical ladder-like display, and receives responses from the participant via onscreen "position" indicator buttons 802, specifically, a left arrow button, and a right arrow button, indicating left and right words or syllables, respectively. Note that these alternative GUIs are meant to be illustrative and exemplary only, and that other GUI layouts and mechanisms are also contemplated.

Adaptive Stimulus Modification

As mentioned above, in preferred embodiments, the modification or adjustment of the delay period of each presentation of the value of each graphical element in the sequence may be performed repeatedly over the course of the exercise based on the correctness or incorrectness of the participant's responses. The adjustments may generally be made to increase the difficulty of the trial or block when the participant answers correctly (e.g., increasing the delay period), and to decrease the difficulty of the trial or block when the participant answers incorrectly (e.g., decreasing the delay period). Moreover, the adjustments may be made such that a specified level of performance, i.e., level of success, is approached and substantially maintained during performance of the exercise. For example, based on the participant's responses, the delay period may be adjusted to substantially achieve and maintain a specified success rate, e.g., 85% for the participant, although other rates may be used as desired.

As also mentioned above, in preferred embodiments, the adjustments may be made using a maximum likelihood procedure, such as a QUEST (quick estimation by sequential testing) threshold procedure, or a ZEST (zippy estimation by sequential testing) threshold procedure, described below, such procedures being well-known in the art of stimulus threshold determination. In some embodiments, these adjustments (e.g., using ZEST) may be determined on a per configuration basis. In other words, for each configuration, the sequences may be presented (and adjusted) in accordance with a maximum likelihood procedure (e.g., ZEST) applied to trials (adjusting a presentation attribute, e.g., SOA or N,) under that configuration, and/or for each block, a maximum likelihood procedure (e.g., ZEST) may be applied to a presentation attribute, e.g., N or SOA, for the next block.

Data Reporting

As noted above, in some embodiments, various aspects of the exercise may be recorded, e.g., for reports, analysis, etc. For example, in one embodiment, trial-by-trial data saved for analysis may include:

1. SOA used in stimulus presented;
2. N used in block;
3. target syllable for trial (each syllable may be assigned an index, e.g., for embodiments with 72 target syllables, an integer value 1-72);
4. list of syllable choices;
5. selection by participant;
6. correct/incorrect response;
7. (mean of posterior probability distribution function); and
8. (standard deviation of posterior probability distribution function);

along with one or more of the following initialization parameters:

1. tracks' initial values;
2. standard deviation of cumulative Gaussian psychometric function; and
3. standard deviation of prior threshold distribution.

Note, however, that these items are exemplary only, and that any items may be recorded as desired.

Additionally, the following presents exemplary initial values related to the adaptive attributes SOA and N, for some embodiments of the exercise:

SOA:
Initial SOA guess: 2.25 s;
Confidence Interval: 0.95;
Confidence Interval Width: 0.2;
Standard deviation of cumulative Gaussian psychometric function: 0.15; and
Standard deviation of prior threshold distribution: 0.15.

N:
Initial n guess: 0;
Confidence Interval: 0.95;
Confidence Interval Width: 0.2;
Standard deviation of cumulative Gaussian psychometric function: 0.15; and Standard deviation of prior threshold distribution: 0.15.

In some embodiments, the repeating of 314 may also include performing threshold assessments in conjunction with, or as part of, the exercise. In other words, the method of FIG. 3 may include assessing the participant's performance a plurality of times during the repeating. Additionally, the assessing the participant's performance a plurality of times may be performed according to the maximum likelihood procedure, e.g., using a 2-stair maximum likelihood procedure. A description of such threshold determination/assessment is provided below.

Threshold Determination/Assessment

As indicated above, delay period (or more generally, stimulus intensity) is an adjustable attribute of presented stimuli whereby a trial or block in the exercise may be made more or less difficult. The term "threshold" refers to the value of the stimulus intensity at which the participant achieves a specified level of success, e.g., 0.9, corresponding to a 90% success rate. Thus, any other attribute or combination of attributes may be used as desired, the term stimulus intensity being intended to refer to any such adjustable attributes.

Exercise based assessments (i.e., threshold determination) are designed to assess a participant's threshold with respect to stimuli on a given exercise, and can be used to adjust stimulus presentation to (substantially) achieve and maintain a desired success rate for the participant, e.g., with respect to a particular exercise, task, or configuration. As will be described below, such threshold determination may also be used to assess or determine a pre-training threshold that can then be used to calibrate the program to an individual's capabilities on various exercises, as well as serve as a baseline measure for assessing the participant's performance periodically during an exercise. Such assessment may also serve as a baseline measure to which post-training thresholds can be compared. Comparison of pre-training to post-training thresholds may be used to determine the gains made as a function of training with the cognition enhancement exercise or tasks described herein.

As noted above, there are various approaches whereby such thresholds may be assessed or determined, such as, for example, the well known QUEST (Quick Estimation by Sequential Testing) threshold method, which is an adaptive psychometric procedure for use in psychophysical experiments, or a related method, referred to as the ZEST (Zippy Estimation by Sequential Testing) procedure or method, among others, although it should be noted that such methods have not heretofore been utilized in cognition enhancement training exercises using an adaptive N-back matching scheme, as described herein.

The ZEST procedure is a maximum-likelihood strategy to estimate a subject's threshold in a psychophysical experiment based on a psychometric function that describes the probability that a stimulus is detected as a function of the stimulus intensity. For example, consider a cumulative Gaussian psychometric function, $F(x-T)$, for a 4-alternative-forced-choice (afc) task with a 5% lapsing rate, with proportion correct (ranging from 0-1) plotted against intensity of the stimulus (ranging from 0-5). As used herein, the term intensity (with respect to stimuli) refers to the value of the adaptive dimension variable being presented to the participant at any particular trial or block in a particular exercise. In other words, the intensity value is that parameter regarding the exercise stimuli that may be adjusted or adapted, e.g., to make a trial or block more or less difficult. For example, in preferred embodiments of the N-back matching exercise presented herein, the intensity value is the delay time (e.g., in milliseconds) of the presented values of the sequence of second stimulus elements (with respect to their corresponding first stimulus elements), which primary dependence may be on either N or SOA. The threshold is defined to be the mean of the Gaussian distribution for a specified success rate—e.g., a value yielding some specified success rate, e.g., 60%, which corresponds to an intensity of 2.

The method may make some assumptions about the psychophysics:

1. The psychometric function has the same shape, except a shift along the stimulus intensity axis to indicate different threshold value.
2. The threshold value does not change from trial to trial (or alternatively, from block to block).
3. Individual trials are statistically independent.

The primary idea of the ZEST procedure is as follows: given a prior probability density function (P.D.F.) centered around the best threshold guess, x, this P.D.F. is adjusted after each trial by one of two likelihood functions, which are the probability functions that the subject will respond "yes" or "no" to the stimulus at intensity as a function of threshold. Since the psychometric function has a constant shape and is of the form $F(x-T)$, fixing the intensity x and treating threshold T as the independent variable, the "yes" likelihood, $p=F(-(T-x))$, is thus the mirror image of the psychometric function about the threshold, and the "no" likelihood function is then simply $1-p$.

The P.D.F. is updated using Bayes' rule, where the posterior P.D.F. is obtained by multiplying the prior P.D.F. by the likelihood function corresponding to the subject's response to the trial's stimulus intensity. The mean of the updated (or posterior) P.D.F. is then used as the new threshold estimate and the test is repeated with the new estimate until the posterior P.D.F. satisfies a confidence interval criteria (e.g. standard deviation of posterior P.D.F.<predetermined value) or a maximum number of trials is reached.

In one example of the ZEST procedure, a single trial of a 4-afc experiment is performed, with x=2.5 (intensity) as the initial threshold guess. If the subject responds correctly, the next trial is placed at the mean of the corresponding posterior P.D.F., ~x=2.3; if the response is incorrect, the next trial is placed at the mean of the corresponding P.D.F., ~x=2.65.

Thus, in some embodiments, a single stair ZEST procedure such as that described above may be used to adjust the intensity of the stimuli for the exercise during training. In contrast, in some embodiments, particularly with respect to the periodic assessments during the exercise (as opposed to the "per response" stimulus adjustment) a 2-stair ZEST procedure may be employed, where two independent tracks with starting values, preferably encompassing the true threshold, each running its own ZEST procedure, are randomly interleaved in the threshold seeking procedure. In addition to their individual termination criterion, the difference between the two stairs may also be required to be within a specified range, e.g., the two stairs may be constrained to be a predetermined distance apart. An exemplary implementation of this approach is described below with respect to exercise threshold assessment.

As used herein, the parameters required for ZEST may include the mean of the prior P.D.F. (threshold estimate), the standard deviation of the prior P.D.F. (spread of threshold distribution), the standard deviation of the cumulative Gaussian distribution (slope of psychometric function), the maximum number of trials (or blocks) to run, and a confidence level and interval. Additionally, in one embodiment, the trial-by-trial (or block-by-block) data saved for analysis may include: the track used, the stimulus intensity presented, the subject's response, the mean of posterior P.D.F., and the standard deviation of the posterior P.D.F., as well as any other data deemed necessary or useful in determining and/or assessing the participant's threshold.

Thus, in preferred embodiments, a maximum likelihood procedure, such as a ZEST procedure, may be used to adjust the stimulus intensity (e.g., N and/or SOA) of the presented sequences during training (e.g., via a single stair ZEST procedure per configuration), and may also be used for assessment purposes at periodic stages of the exercise (e.g., via a dual stair ZEST procedure, describe below). In one embodiment, such assessment may occur at specified points during the exercise, e.g., at 0% (i.e., prior to beginning), 25%, 50%, 75%, and 100% (i.e., after completion of the exercise) of the exercise. An example of such assessment is now described.

A primary purpose of the assessment is to determine the smallest stimulus intensity, e.g., the greatest value of N and/or the smallest value of SOA, in an N-back matching task that a person can respond correctly to above a statistical threshold. The assessment may be similar to the exercise with respect to audio and/or visual (audio/visual) presentation, where the differences between the assessment and the exercise lie (at least primarily) in the movement or progression through the task and the data that are obtained from this movement for the assessment. The procedure is designed to obtain a threshold, which is a statistical rather than an exact quantity. In one embodiment, for the purposes of this exercise, the threshold may be defined as the smallest stimulus intensity, e.g., the greatest value of N and/or the smallest value of SOA, at which the participant will fail to respond correctly a specified percentage, e.g., 69%, 85%, 90%, etc., of all trials for the task. In a preferred embodiment, being a computer based task, the assessment may use the ZEST procedure to progress or move through the task, adjust the stimulus intensity for the sequences, and determine the statistical threshold.

As noted above, many aspects of the assessment may generally be similar, or possible even identical, to the exercise task with respect to audio/visual presentation. However, some aspects of the exercise may not be necessary in the assessment. For example, with regard to the GUI, in some embodiments, GUI elements such as score indicator, bonus indicator, etc., may not be necessary, and so may be omitted. Features or assets that may remain the same may include the "ding", "thunk", and "chime" sounds (or equivalents) that play after a participant responds correctly or incorrectly. The assessment stimulus presentation may also be identical to the training version.

The following describes one embodiment of a 2-stair (dual track) approach for determining a psychophysical threshold for a participant, e.g., an aging adult, where the task is directed to perception of presented sequences, and where the stimulus intensity includes the duration or value of the SOA, referred to simply as "duration", although it should be noted that this attribute is used for illustration purposes only, and other attributes may be used as desired, e.g., N, etc. Initially, first and second tracks may be initialized with respective durations based on an initial anticipated threshold, where the initial anticipated threshold is an initial estimate or guess of a duration corresponding to a specified performance level of the participant, e.g., SOA at which the participant fails to respond correctly some specified percentage of the time, e.g., 69%. For example, in one embodiment, the first track may be initialized to a first duration that is below the initial anticipated threshold, e.g., preferably just slightly below the initial anticipated threshold, and the second track may be initialized to a second duration that is (e.g., slightly) above the initial anticipated threshold. Thus, the initial durations of the two tracks may straddle the initial anticipated threshold.

The method elements of the cognitive training exercise, e.g., such as the exercise of FIG. 3, may be performed, where the sequence(s) of elements are presented in accordance with the duration (or more generally, the stimulus intensity) of a specified one of either the first track or the second track. In other words, one of the tracks may be selected or otherwise determined, and the stimuli (first stimulus and second stimulus elements) may be presented with a duration (SOA) of or specified by the selected track. Thus, in preferred embodiments, the initial anticipated threshold, the first duration, the second duration, and the (to be determined) threshold each is or includes a respective stimulus duration or presentation time (possibly including the ISI). As also described above, the participant may be required to respond to the sequence of second stimulus elements, and a determination may be made as to whether the participant responded correctly.

The duration (or more generally, the stimulus intensity) of the specified track may then be adjusted or modified, based on the participant's response (see, e.g., 312). For example, the duration (SOA) of the track may be modified in accordance with a maximum likelihood procedure, such as QUEST or ZEST, as noted above. In one embodiment, for each track, modifying the duration of the specified track based on the participant's response may include increasing the duration if the participant responds incorrectly, and decreasing the duration if the participant responds correctly (thus increasing the rate of presentation of the sequences). Thus, for each assessment trial (in a given track), the duration for the sequence presentation for that trial may be determined by the performance of the previous trial for that track. In other words, the participant's response to the stimulus determines that track's next stimulus duration via the maximum likelihood method.

Similar to 314 of FIG. 3, the presenting the temporal sequence of the plurality of the first stimulus elements, presenting the temporal sequence of groups of the plurality of the second stimulus elements, requiring, determining, and modifying or adjusting (of the period of the SOA, or more generally, the stimulus intensity), may be repeated one or more times in an iterative manner, but in this case, the repeating is performed to determine respective final durations for the first track and the second track. For example, in one embodiment, trials in the first track and the second track may be performed in an alternating manner, or, alternatively, trials may be performed in the first track and the second track randomly with equal probability. Thus, over numerous trials, the number of trials performed in each track should be equal, or at least substantially equal. In preferred embodiments, the presenting, requiring, determining, and modifying, may be repeated until the durations of the first track and the second track have converged to values within a specified confidence interval, and where the values are within a specified distance from each other, or, until a specified number of trials have been conducted for each track. In other words, the repetition may continue until either some maximum number of trials has been performed, or until convergence conditions for the tracks have been met, both singly, and together. For example, each track may be required converge to a respective duration value, and the convergent values for the two tracks may be required to be within some distance or interval of each other.

A threshold for the participant may then be determined based on the respective final durations for the first track and the second track, where the threshold is or specifies the stimulus duration or presentation time associated with the specified performance level of the participant. For example, as mentioned above, the determined threshold may specify the duration (i.e., the presentation time) at which the participant fails to respond correctly some specified percentage of the trials, e.g., 50%, 69%, etc., although it should be noted that any other percentage may be used as desired. In one embodiment, the threshold for the participant may be determined by averaging the respective final durations for the first track and the second track. More generally, the threshold for the participant may be determined by averaging the respective final stimulus intensity values for the first track and the second track.

Thus, in one embodiment, when making an assessment, the mean of two randomly interleaved Zests may be used with estimates made at a threshold level of 50% to make the estimate (which is standard for this type of task). When training, a single staircase ZEST procedure may used with a threshold level of 85%.

Figure 9:
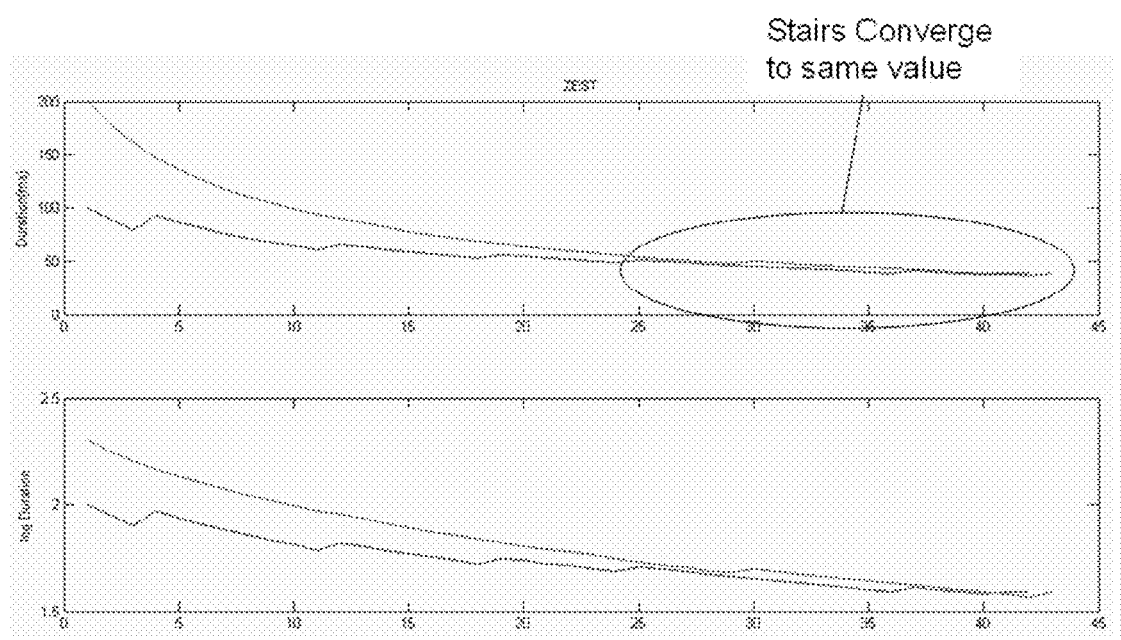
FIG. 9 illustrates convergence to a threshold value over a series of trials in an exemplary two-stair ZEST threshold procedure.

FIG. 9 illustrates an exemplary case where two tracks or "stairs" used in a ZEST threshold procedure are shown converging to a threshold value (in this case, duration) over a series of trials. Note that in the top graph, duration vs. trials is plotted in a linear manner, whereas the bottom graph provides the same information but is logarithmic on the duration (vertical) axis. As may be seen, after about 25 trials, the two tracks or stairs converge to a value at or near 50 ms, thus, the two tracks, initialized respectively to values above and below an initial estimate of the threshold, converge to an approximation of the participant's actual stimulus threshold for the exercise.

The following table is an exemplary list of syllables that may be suitable for use in embodiments of the present exercise:

TABLE 1

| Category 1 | category 2 | category 3 | category 4 | category 5 |
|---|---|---|---|---|
| Ab | boon | bag | bake | bod |
| Odd | crags | cabs | dane | bomb |
| Eeg | fake | cacks | day | BON |
| Oop | gone | cads | nane | bons |
| Et | kegs | cag | PAKE | cob |
| Awk | lash | CAGS | pakes | don |
| Al | let | cangs | pape | dop |
| Or | pab | dat | pate | lop |
| Oss | peg | flat | pay | nop |
| Oots | poke | lad | plake | on |
| Ezz | roff | lap | sane | rob |
| Oash | roop | LAT | tabe | rock |
| Each | shay | lath | tade | ROP |
| Av | shob | mag | take | rot |
| Oaf | taint | pad | tame | sob |
| Awm | toe | PAG | TANE | TOB |
| Oon | tone | pags | taned | tom |
| Eth | tube | pang | tape | top |
|  |  | sat | tave | tov |
|  |  | tag | TAY | trob |
|  |  | tags | thay | von |

Note that in this exemplary list, some of the syllables are capitalized, indicating that assessments may be performed when these elements are presented.

In some embodiments, the method may also include performing a plurality of practice trials, i.e., prior to performing the method elements described above. For example, in some embodiments, one or more practice sessions may be performed prior to the beginning of training to familiarize the participant with the nature and mechanisms of the exercise. For example, in one embodiment, before training begins, the participant may perform at least one practice session including a specified number of trials (e.g., 5) for each of one or more practice configurations. In some embodiments, the participant may be able to invoke such practice sessions at will during the exercise, e.g., to re-familiarize the participant with the task at hand.

In some embodiments, additional trials, referred to as "eureka" trials, may be performed periodically, e.g., every 20 trials or so, including non-ZEST trials that are easier than the current threshold estimate—e.g. using SOA values or durations that are twice the threshold. These easier trials may serve to encourage the participant to continue the exercise, and improve or maintain the participant's morale.

Thus, embodiments of the cognitive training exercise described herein may operate to improve a participant's cognition, e.g., executive function, attention, and working memory, and possibly including, for example, overall speed and accuracy of visual processing, audio/visual working memory retention and retrieval, and attention, among others. It should be noted that the particular exercise disclosed herein is meant to be exemplary, and that other repetition-based cognitive training exercises using audio/visual stimuli with multiple stimulus sets may be used as desired, possibly in combination. In other words, the exercise described herein is but one example of a cognitive training exercise using a computing system to present audio/visual stimuli to a participant, record the participant's responses, and modify some aspect of the stimuli or its presentation based on these responses, where these method elements are repeated in an iterative manner using multiple sets of stimuli to improve the executive function, attention, and working memory of the participant. Note particularly that such cognitive training using a variety of such audio/visual stimulus-based exercises, possibly in a coordinated manner, is contemplated.

Those skilled in the art should appreciate that they can readily use the disclosed conception and specific embodiments as a basis for designing or modifying other structures for carrying out the same purposes of the present invention without departing from the spirit and scope of the invention as defined by the appended claims. For example, various embodiments of the methods disclosed herein may be implemented by program instructions stored on a memory medium, or a plurality of memory media.

We claim:

1. A method for enhancing cognition in a participant, utilizing a computing device to present stimuli for training, and to record responses from the participant, the method comprising:

providing multiple first stimulus elements on a non-transitory computer-readable medium, wherein the multiple first stimulus elements are available for presentation to the participant;

providing multiple second stimulus elements on a non-transitory computer readable medium, wherein the multiple second stimulus elements are also available for presentation to the participant, and wherein at least a portion of the first stimulus elements correspond respectively to the second stimulus elements;

presenting a temporal sequence of a plurality of the first stimulus elements through the computing device, including presenting each first stimulus element in the sequence for a specified computer-controlled duration separated by a specified computer-controlled interval;

after a specified computer-controlled delay period, presenting a temporal sequence of groups of a plurality of the second stimulus elements through the computing device concurrently with said presenting the temporal sequence of the plurality of the first stimulus elements, wherein each group comprises a matching second stimulus element that matches a corresponding first stimulus element presented earlier by the specified computer-controlled delay period, wherein the specified computer-controlled duration plus the specified computer-controlled interval composes a specified stimulus onset asynchrony (SOA), wherein each group of second stimulus elements is presented for the duration of the SOA, wherein the computer-controlled delay period comprises the SOA times a specified value N, wherein the matching second stimulus element matches a corresponding first stimulus element presented N first stimulus elements back, and wherein N is a non-integer value;

for each presented group of second stimulus elements, prompting the participant to respond through an input device to the computing device, including either indicating the matching second stimulus element, or indicating a second stimulus element in the group that does not match the corresponding first stimulus element;

automatically determining, through the computing device, whether the participant responded correctly;

automatically modifying the delay period based on said automatic determining; and repeating said presenting the temporal sequence of the plurality of the first stimulus elements, said presenting the temporal sequence of groups of the plurality of the second stimulus elements, said prompting, said automatically determining, and said automatically modifying one or more times in an iterative manner to improve the participant's cognition.

2. The method of claim 1, wherein said presenting the temporal sequence of the plurality of the first stimulus elements, said presenting the temporal sequence of groups of the plurality of the second stimulus elements, said prompting, said automatically determining, and said automatically modifying composes performing a block, and wherein said repeating comprises performing a block under each of a plurality of configurations, wherein each configuration specifies one or more attributes of the first stimulus elements and/or second stimulus elements or their presentation.

3. The method of claim 2, wherein the first stimulus elements and the second stimulus elements comprise auditory or visual elements.

4. The method of claim 3,
wherein each block comprises a plurality of trials, each trial comprising the presentation of a group and the participant's response;
wherein said automatically determining if the participant responded correctly comprises:
for each trial, determining if the participant responded correctly for the trial; and
wherein said modifying the delay period comprises modifying N.

5. The method of claim 4,
wherein said automatically determining if the participant responded correctly further comprises:
for each block, determining whether the participant achieved a specified level of success; and
wherein said automatically modifying the delay period comprises modifying the SOA based on said determining whether the participant achieved the specified level of success.

6. The method of claim 5, wherein said automatically determining whether the participant achieved a specified level of success comprises:
automatically determining whether N exceeds a specified threshold value at the end of the block.

7. The method of claim 5, wherein said modifying the SOA and/or said modifying N is performed using a maximum likelihood procedure.

8. The method as recited in claim 7, wherein the maximum likelihood procedure comprises one or more of:
a QUEST (quick estimation by sequential testing) threshold procedure; or
a ZEST (zippy estimation by sequential testing) threshold procedure.

9. The method of claim 3,
wherein each block comprises a plurality of trials, each trial comprising the presentation of a group and the participant's response;
wherein said automatically determining if the participant responded correctly comprises:
for each trial, determining if the participant responded correctly for the trial; and
wherein said automatically modifying the delay period comprises modifying the SOA.

10. The method of claim 9,
wherein said automatically determining if the participant responded correctly further comprises:
for each block, determining whether the participant achieved a specified level of success; and
wherein said automatically modifying the delay period comprises modifying N based on said determining whether the participant achieved the specified level of success.

11. The method of claim 10, wherein said determining whether the participant achieved a specified level of success comprises:
determining whether the SOA is below a specified threshold value at the end of the block.

12. The method of claim 10, wherein said modifying the SOA and/or said modifying N is performed using a maximum likelihood procedure.

13. The method as recited in claim 12, wherein the maximum likelihood procedure comprises one or more of:
a QUEST (quick estimation by sequential testing) threshold procedure; or
a ZEST (zippy estimation by sequential testing) threshold procedure.

14. The method of claim 3,
wherein each group of second stimulus elements is a pair of second stimulus elements comprising the matching second stimulus element and a non-matching second stimulus element, and wherein the matching second stimulus element is presented on the left side of the non-matching second stimulus element, or on the right side of the non-matching second stimulus element; and
wherein said presenting each first stimulus element comprises presenting the first stimulus element to the participant's left side, right side, or both sides equally.

15. The method of claim 14, wherein each of the plurality configurations specifies one or more of:
stimulus set, comprising a set of first stimulus elements from which the plurality of first stimulus elements of the sequence are selected, and a set of second stimulus elements comprising second stimulus elements that match at least a subset of the first stimulus elements, wherein each set of first stimulus elements has a specified confusability;
direction of first stimulus presentation, comprising one of:
consistent, wherein each first stimulus element and the corresponding second stimulus element are presented on a same side;
binaural, wherein each first stimulus element is presented to the participant's left and right sides equally;
random, wherein each first stimulus element is presented to the participant's left or right side randomly; or distracting, wherein each first stimulus element and the corresponding second stimulus element are presented on different sides, respectively;
length of sequences;
clarity of first stimulus elements; or
levels of audio processing of audio elements.

16. The method of claim 3,
wherein each group of second stimulus elements comprises three or more second stimulus elements, wherein said presenting the temporal sequence of groups of the plurality of the second stimulus elements comprises visually presenting a two-dimensional grid of the second stimulus elements comprising the matching second stimulus element and two or more non-matching second stimulus elements, and wherein the matching second stimulus element is visually presented at a specified position in the grid; and
wherein said prompting the participant to respond comprises indicating the position in the grid of the matching second stimulus element.

17. The method of claim 2, further comprising:
for each block, presenting instructions for trials in the block, wherein the instructions instruct the participant to respond to each group by either indicating the matching second stimulus element, or indicating a second stimulus element in the group that does not match the corresponding first stimulus element.

18. The method of claim 2 wherein said performing a plurality of trials under each of a plurality of configurations comprises:
performing a plurality of trials under each of a plurality of increasingly difficult configurations.

19. The method of claim 2, further comprising:
automatically indicating, through the computing device, whether the participant responded correctly, wherein said indicating is performed audibly and/or graphically.

20. The method of claim 19, wherein said automatically indicating, through the computing device, whether the participant responded correctly comprises one or more of:
for each group, indicating whether the participant responded correctly; or
for each block, indicating whether the participant achieved a specified level of success for the block.

21. The method of claim 2, wherein said repeating comprises:
assessing the participant's performance a plurality of times during said repeating.

22. The method of claim 21, wherein said assessing the participant's performance a plurality of times is performed according to the maximum likelihood procedure.

23. The method of claim 2, further comprising:
automatically recording each response of the participant; and/or
automatically recording whether the participant responded correctly.

24. The method of claim 1, further comprising:
performing one or more practice sessions under each of one or more configurations.

25. The method of claim 1, wherein said repeating occurs a specified number of times each day, for a specified number of days.

26. The method of claim 1, wherein the first stimulus elements and the second stimulus elements correspond to one or more of:
syllables;
words;
shapes;
objects; or
patterns.

27. A computer-readable memory medium that stores program instructions for enhancing cognition in a participant, utilizing a computing device to present stimuli for training, and to record responses from the participant, wherein the program instructions are executable by a processor to perform:
providing multiple first stimulus elements on a non-transitory computer-readable medium, wherein the multiple first stimulus elements are available for presentation to the participant;
providing multiple second stimulus elements on a non-transitory computer-readable medium, wherein the multiple second stimulus elements are available for presentation to the participant, and wherein at least a portion of the second stimulus elements correspond to the first stimulus elements;
presenting a temporal sequence of a plurality of the first stimulus elements through the computing device, including presenting each first stimulus element in the sequence for a specified computer-controlled duration separated by a specified computer-controlled interval;
after a specified computer-controlled delay period, presenting a temporal sequence of groups of a plurality of the second stimulus elements through the computing device concurrently with said presenting the temporal sequence of the plurality of the first stimulus elements, wherein each group comprises a matching second stimulus element that matches a corresponding first stimulus element presented earlier by the specified computer-controlled delay period, wherein the specified computer-controlled duration plus the specified computer-controlled interval composes a specified stimulus onset asynchrony (SOA), wherein each group of second stimulus elements is presented for the duration of the SOA, wherein the computer-controlled delay period comprises the SOA times a specified value N, wherein the matching second stimulus element matches a corresponding first stimulus element presented N first stimulus elements back, and wherein N is a non-integer value;
for each presented group of second stimulus elements, prompting the participant to respond through an input device to the computing device, including either indicating the matching second stimulus element, or indicating a second stimulus element in the group that does not match the corresponding first stimulus element;
automatically determining, through the computing device, whether the participant responded correctly;
automatically modifying the delay period based on said automatic determining; and
repeating said presenting the temporal sequence of the plurality of the first stimulus elements, said presenting the temporal sequence of groups of the plurality of the second stimulus elements, said prompting, said automatically determining, and said automatically modifying one or more times in an iterative manner to improve the participant's cognition.

* * * * *